United States Patent [19]
Daniello

[11] Patent Number: 5,601,213
[45] Date of Patent: Feb. 11, 1997

[54] CONTAINER LID WITH QUANTITY MEASURES

[76] Inventor: Jennifer J. Daniello, P.O. Box 14824, N. Palm Beach, Fla. 33408-0824

[21] Appl. No.: 641,731

[22] Filed: May 2, 1996

[51] Int. Cl.⁶ .................................................. G01F 11/26
[52] U.S. Cl. ......................................... 222/456; 222/480
[58] Field of Search ........................... 222/142.5, 142.9, 222/144.5, 444, 454, 456, 480, 485, 486, 565, 23

[56] References Cited

U.S. PATENT DOCUMENTS

| | | |
|---|---|---|
| 3,311,264 | 3/1967 | Cayer . |
| 3,312,366 | 4/1967 | Poris . |
| 3,414,172 | 12/1968 | Souza . |
| 3,737,075 | 6/1973 | Atchley ............................ 222/142.9 |
| 4,232,718 | 11/1980 | Wippermann . |
| 4,346,823 | 8/1982 | Eppenbach ........................... 222/456 |
| 4,380,307 | 4/1983 | Stillinger ............................ 222/142.9 |
| 4,961,521 | 10/1990 | Eckman ............................... 222/456 |
| 5,236,022 | 8/1993 | Husted . |
| 5,465,871 | 11/1995 | Robbubs, III ........................ 222/480 |

FOREIGN PATENT DOCUMENTS

| | | |
|---|---|---|
| 595071 | 3/1960 | Canada . |
| 633017 | 7/1936 | Germany . |

Primary Examiner—Philippe Derakshani
Attorney, Agent, or Firm—Richard C. Litman

[57] ABSTRACT

A container lid with quantity measures provides for the selective dispensing of different predetermined quantities of material from a container to which the lid is removably attached. The lid includes a central body portion having a plurality of differently sized volumes therein, each of which is selectively openable and closable relative to the container to which the lid is secured. A rotatable top portion is turned to select the desired specific quantity, which action also turns the closure plate below the main body portion. The container lid is used by inverting the container and attached lid, rotating the top portion to a position other than the quantity selected in order to move the closure plate from that selected volume, rotating the top portion to the selected quantity to close the selected volume, and dispensing the selected quantity from a dispenser in the top portion. The configuration of the main body portion also allows the closure plate or valve to be bypassed, to allow continuous pouring or shaking of material from the container as desired. The present container lid is particularly adapted for use in the dispensing of specific quantities of spices, condiments, and the like for cooking and food preparation, but may be used to dispense virtually any dry granulated or powdered material, and may even be adapted for use with certain liquids.

20 Claims, 4 Drawing Sheets

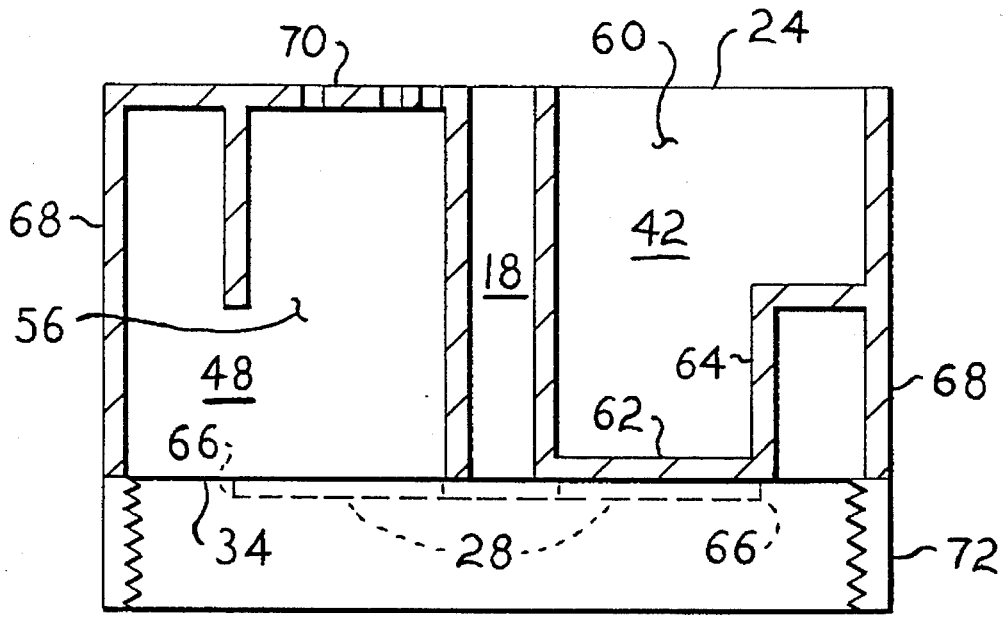
FIG. 5
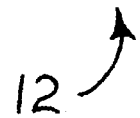
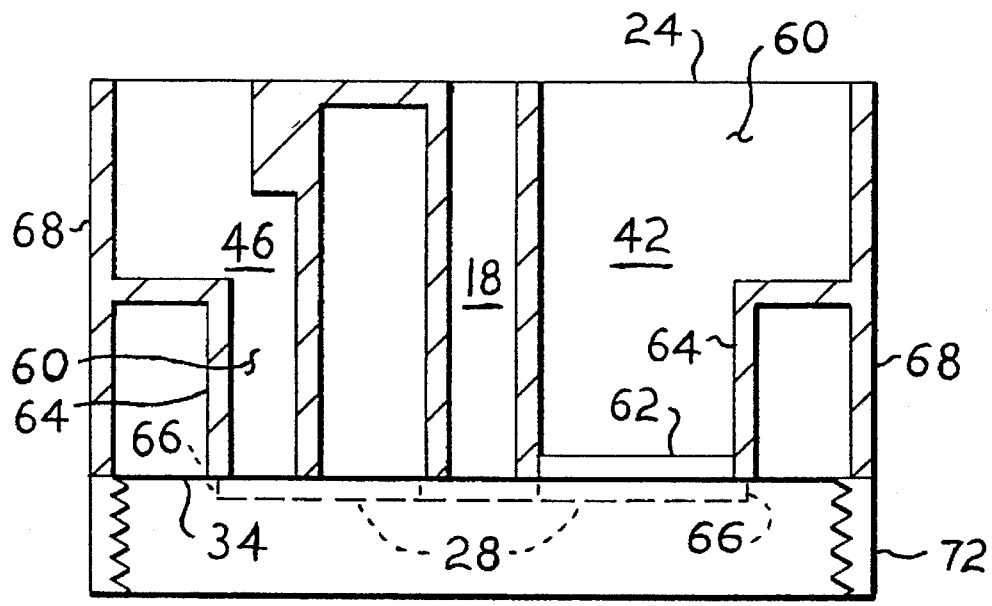
FIG. 6
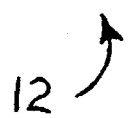

CONTAINER LID WITH QUANTITY MEASURES

BACKGROUND OF THE INVENTION

1. Field of the Invention

The present invention relates generally to quantity measuring and dispensing devices, and more particularly to a cap or lid adaptable for installation to an existing spice or condiment container or the like, which cap provides for the selective and separate dispensing of various different quantities of material from the container, while also providing for the selective continuous pouring or shaking of material from the container. The present cap is particularly well adapted for use in the measuring and dispensing of spices and the like in food preparation and cooking, but is also well adapted for use in the dispensing of specific quantities of other goods as well.

2. Description of the Prior Art

The precise measurement and dispensing of various quantities of goods from their respective storage containers, is a practice used in innumerable different fields. One of the primary uses of such a practice is in cooking and food preparation, where precise amounts of condiments, spices, and other foodstuffs must be measured and dispensed for most recipes. Heretofore, the usual means of accomplishing this was to measure the desired quantities using an assortment of measuring spoons, graduated cups, etc.

While such a procedure accomplishes the desired result, it requires at least one set of measuring implements separate from the dispensing container. Moreover, oftentimes identical quantities of various different dry and/or liquid ingredients must be used in a single recipe, and a cook with only one set of measuring implements at his/her disposal, must take the time to clean the appropriate size implement before using it to dip into a container having a different material therein than that previously measured, in order to avoid contaminating the contents of the second container with residue remaining on the measuring implement. This is particularly true with liquid measurement, where the implement must be washed and dried completely between each measurement, so as to preclude sticking of powdered material to the clean, but damp, implement.

Such a cumbersome operation results in most food preparers having at least a few measuring utensils of identical quantities available during the preparation of any recipe. Such an approach is complex, and the preparer must keep track of which utensils have been used with which food materials, which are clean and which have been used, and then has the additional chore of cleaning all of the different measuring utensils used during the task.

As a result, various devices have been developed in the past to attach directly to a container, and to dispense a specific quantity of material therefrom as desired. Most dispense only a single specific quantity, are not adapted for continuous dispensing, or differ from the present invention in some manner, as will be discussed in the following review of the prior art.

U.S. Pat. No. 3,311,264 issued to Arthur W. Cayer on Mar. 28, 1967 describes a Measuring And Dispensing Device which provides for the selective measurement and dispensing of various different small quantities of material from a container, i.e., a jar or the like having a circular mouth. The container must be modified to include a partition covering exactly one half of the opening, with a rotatable member having plural internal volumes being sandwiched between the fixed partition and an outermost fixed cover having a dispensing passage therethrough. The passage is 180 degrees out of registry with the open side of the container mouth, and is thus positioned over the underlying partition. Inverting the container and turning the rotatable member results in quantities of material being captured within the volumes of the rotatable member, and then being dispensed from the outermost passage. This structure cannot provide for continuous dispensing or shaking of larger quantities, as provided by the present invention.

U.S. Pat. No. 3,312,366 issued to Harry Poris on Apr. 4, 1967 describes a Measuring Device And Cover comprising a cap adapted for removable attachment over an open spout or raised boss on a container lid. The cap has an extension adapted to cover a second opening, with the extension end having a depression therein with a specific volume. The cap and extension must be removed from the container top and used in the manner of conventional measuring spoons, unlike the present invention, which remains secured to the top of the container during use, and is only removed when the container is emptied.

U. S. Pat. No. 3,414,172 issued to Augustine A. Souza on Dec. 3, 1968 describes a Dispensing Device for the selective dispensing of two specific quantities of material from a container, with the second quantity being exactly twice the first. A single internal volume is provided, with two internal openings between the single internal volume of the lid and the container. The assembly must be inverted so material may flow through one or both internal openings as selected, and then tilted to allow the material to flow from the dispensing opening. The Souza device may only be used with dry materials, as such materials will spill into the internal volume only until an angle of repose is established; liquids would tend to seek their own level, and would continue to pour through the internal volume and out the dispensing opening. The present invention does not rely upon the internal friction of the material being dispensed, but provides separate specific volumes, which are completely closed at the time of material measurement. Further, the present invention is not limited to the measurement of only two specific quantities, with one being twice the other, as with Souza.

U. S. Pat. No. 4,232,718 issued to Gerhard Wippermann on Nov. 11, 1980 describes a Device For The Portioned Removal Of Granules, comprising a spring loaded closure operating radially in a container lid. The container is inverted, and a single separate measuring spoon is inserted into the closure to push it back and allow the material to fall into the spoon. The spring pushes the closure shut as the spoon is withdrawn. Only one quantity may be dispensed. No relationship is seen to the present container lid.

U.S. Pat. No. 5,236,022 issued to Wayne D. Husted on Aug. 17, 1993 describes a Lid With Built-In Dispensing Scoop having a scoop which is laterally insertable and removable from the lid, on radial tracks. A blade extends from both ends of the scoop, with the outermost blade serving as a handle, and a separable opposite blade serving to block continued flow from the inverted container. Thus, the device bears more resemblance to the Wippermann assembly discussed above, than to the present invention. Husted provides for different quantity measures by means of a separate insert which may be placed within the scoop, unlike the present invention with its self contained plural quantity measuring and dispensing means.

Canadian Patent No. 595,071 issued to Marcel Boisvert on Mar. 29, 1960 describes a Measuring Dispenser comprising an inner and an outer cap, each having an axially offset passage therethrough. The two passages are not in registry with one another. A relatively thick central body with a specifically sized passage therethrough, is rotatably sandwiched between the two caps. The device is used by inverting the container, rotating the central body so its passage is aligned with the innermost cap to allow material to flow from the container into the central body passage, and again rotating the body until the filled passage aligns with the outer cap opening. Thus, the fixed and rotating components are exactly opposite those of the present invention. The Boisvert arrangement allows for only a single specific quantity to be measured and dispensed, and cannot provide for continuous flow or shaking of material from the container lid, as provided by the present invention.

Finally, German Patent Publication No. 633,017 to Frigola & Co. and published on Jul. 17, 1936 describes a specially adapted container having a bottom opening with an internal closure flap or blade, and a lateral opening therebelow. A specially adapted scoop having closure flap engagement means thereon, is inserted into the lateral opening and contacts the closure flap to push it aside, whereupon material flows from the container, through the bottom opening, and into the scoop. The scoop pulls the closure flap closed as the scoop is withdrawn from the container, to shut off the material flow. Accordingly, the device is more closely related to the devices of the Wippermann and Husted patents discussed further above, than to the present invention.

None of the above inventions and patents, taken either singly or in combination, is seen to describe the instant invention as claimed.

SUMMARY OF THE INVENTION

Accordingly, it is a principal object of the invention to provide an improved container lid with quantity measures, which provides for the separate measuring and dispensing of a plurality of different predetermined specific quantities of material from a container.

It is another object of the invention to provide an improved container lid which also provides for the continuous dispensing of a material therefrom, by pouring from a large opening or by shaking from a perforated grid.

It is a further object of the invention to provide an improved container lid which is adapted to be removably installable to a container, and which may be removed from a depleted container for refilling of the container or for installation to another container, as desired.

An additional object of the invention is to provide an improved container lid which is particularly adapted for the dispensing of dry granulated, powdered, or other comminuted materials, but which may be adapted for use with fluid materials as well.

Still another object of the invention is to provide an improved container lid which may be provided separately or in combination with a container of dispensable materials, as desired.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

FIG. 5 is an elevation view of the central body portion of the present container lid, taken along line 5—5 of FIG. 3.

FIG. 6 is an elevation view of the central body portion of the present container lid, taken along line 6—6 of FIG. 3.

Similar reference characters denote corresponding features consistently throughout the attached drawings.

DETAILED DESCRIPTION OF THE PREFERRED EMBODIMENT

Figure 1:
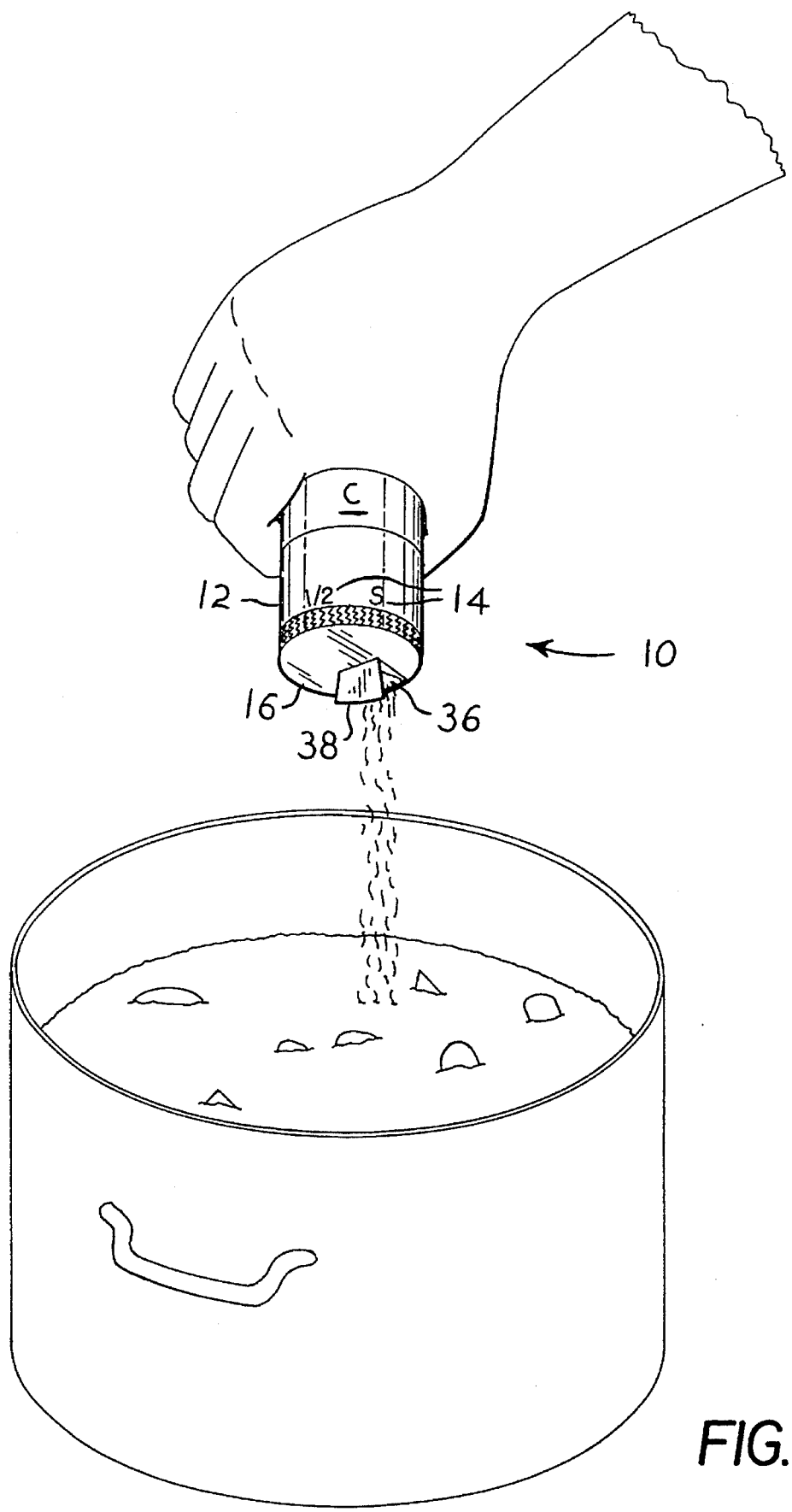
FIG. 1 is a perspective view of the present container lid with quantity measures in use, showing it attached to a container and being used for the dispensing of a predetermined specific amount of material without need for a separate measuring implement.

The present invention comprises a container lid 10 which provides for the measuring and dispensing of specific selected quantities of material directly from a container C, as shown generally in FIG. 1. The lid 10 includes a cylindrical central body portion 12 which is preferably removably affixed to the container C, which central body 12 includes a plurality of chambers each having a different volume from one another, and with some adapted to provide continuous flow therethrough, as shown in FIGS. 2 through 6 of the drawings. The central body 12 includes a series of quantity indication marks 14 thereon corresponding to the chamber volumes within the body 12, with which the circular cover 16 is aligned for the dispensing of the specific quantity.

Figure 2:
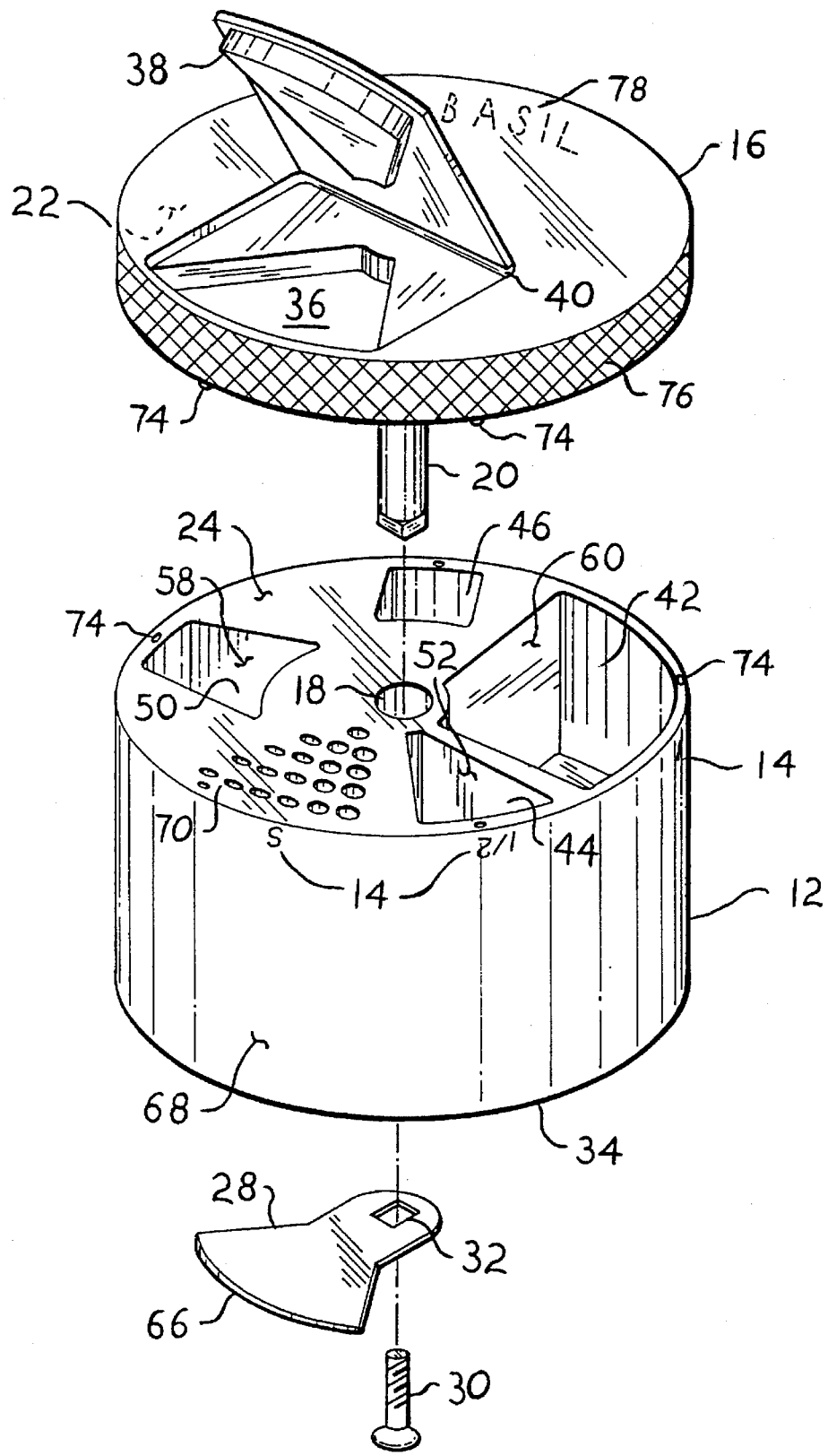
FIG. 2 is an exploded perspective view of the present container lid, showing its various components and relationships.

FIG. 2 provides an exploded perspective view of the present container lid and further details of its various components. The central body portion 12 of the device includes a central passage 18 completely therethrough, through which a central shaft 20 passes. The central shaft 20 is immovably affixed to and extends from the inner side 22 of the cover 16, i.e., the side or surface which mates with the first end 24 of the central body portion 12 of the device.

The distal end of the shaft 20 provides for the fixed attachment of a closure plate 28 thereto, which plate 28 provides for the selective closure of each one of the chambers within the central body 12, as desired with the rotation of the cover 16 relative to the body 12. A screw 30 or other fastening means may be used to secure the closure plate 28 to the central shaft distal end, as desired. (The shaft distal end may be squared, with a corresponding square passage 32 through the closure plate 28, or some other means, e.g., key and keyway, splines, etc., may be used to immovably affix the closure plate 28 to the central shaft distal end, to prevent relative movement therebetween.)

It will be seen that the closure plate 28 subtends an arcuate segment of a circle, with the arcuate span of the plate 28 matching the arcuate spans or circular segments subtended by each of the chamber openings in the second end 34 of the central body 12, which chamber openings and their respective volumes are disclosed in FIGS. 3 through 6 and discussed further below.

The top cover 16 of the lid assembly includes an opening 36 therein, which opening 36 is also in the form of an arcuate segment of a circle. The arcuate span of the opening 36 is also equal to the arcuate span of the chamber openings of the central body second end 34, which openings are all of equal span in order to correspond with the arcuate span of the closure plate 28. The arcuate spans of the chamber openings in the first end 24 of the central body 12 may vary in width, but in any case the span of the cover opening 36 is substantially equal to that of the closure plate 28, and does not overlap more than a single chamber opening when the cover 16 is positioned properly relative to the central body 12. It should also be noted that the cover opening 36 is in direct registry with the closure plate 28, so that they lie in exact alignment with one another when the lid 10 is assembled with the cover 16 and closure plate 28 sandwiching the central body 12 therebetween.

The cover opening 36 is selectively closable by a top closure 38, cap, etc., which is preferably permanently secured to the cover 16 by means of a live hinge 40, i.e., comprising a thin, flexible portion of the top closure 38 and the cover 16, all formed as a single, monolithic unit. Other types of hinge means, or a completely separable cap, may be provided alternatively as desired. The top closure 38 provides a close fit within the cover opening 36, to provide a good seal for the opening 36 as the container lid 10, and any container C to which the lid 10 is secured, along with the contents of the container C, are manipulated.

FIGS. 3 through 6 provide detailed views of the interior of the central body portion 12 of the lid 10, as well as other details. In the top plan view of FIG. 3 a plurality of innermost first chambers, designated as 42, 44, and 46, and second chambers extending further outward radially and designated as 48 and 50, may be seen through the various chamber openings in the first end 24 of the central body 12 and also between the various internal walls shown in broken lines in FIG. 3. (While a total of five chambers 42 through 50 are disclosed, it will be understood that more or fewer first and second chambers may be provided, as desired.) Each of these chambers 42 through 50 is disposed radially about the central passage 18 through the body 12, and are separated by a plurality of generally radially disposed walls 52 through 60, which extend internally from the first end 24 to the second end 34 of the central body 12.

Each of these radially disposed walls 52 through 60 is separated from one another by an arcuate span, which spans may vary somewhat from one another depending upon the specific volume of the respective chambers 42 through 50, and particularly the volumes of the first chambers 42 through 46. As there are five separate chambers 42 through 50 in the embodiment of the present invention disclosed herein, it will be seen that each of the walls 52 through 60 is separated by an arcuate span averaging 72 degrees, with each of the chambers also subtending an average arcuate volume of 72 degrees.

However, in the case of a larger volume, e.g., the first chamber 42, it will be seen that the walls 52 and 60 are arcuately separated by some 90 degrees. As the arcuate span of the closure plate is only some 72 degrees, accommodation is made by first chamber second end flanges 62, which flanges serve to close the first end opening for the first chamber 42 to an arcuate span of substantially 72 degrees. Thus, the arcuate angle of 72 degrees subtended by the closure plate 28 will always be sufficient to completely close off the first end opening of any of the first chambers 42 through 46. The same means of narrowing the first end opening for the second chambers 48 and 50 may be used, but is not critical as with the first chambers 42 through 46, as will be explained below.

Figure 3:
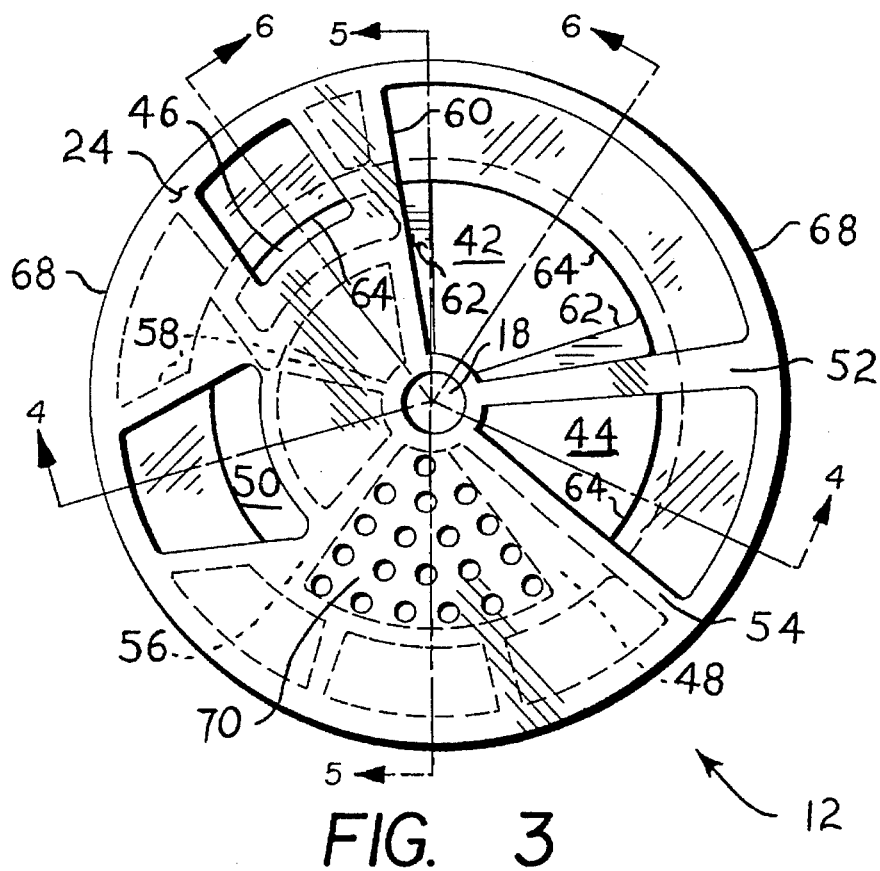
FIG. 3 is a top plan view of the central body portion of the present container lid.

It will be noted in a careful review of FIG. 3, that each of the first chambers 46 through 50 extends only part of the radial distance from the central passage 18, outward to the cylindrical outer wall of the central body portion 12 of the lid. The outermost wall for each of these first chambers 46 through 50 comprises the first wall 64 within the central body 12, and is concentric about the central passage 18. The radial distance from the center of the body 12 to the first wall 64, is equal to the radius of the closure plate 28. Thus, the outermost edge 66 of the closure plate 28 will lie in registry with the first wall 64 at the second end 34 of the central body 12, thereby serving to block any flow into any of the first chambers 46 through 50 across which the closure plate 28 may be positioned.

The outermost wall 68 of the central body 12 provides a second wall diameter larger than that of the internal first wall 64. This outer or second wall 68 diameter is also substantially equal to the diameter of the top cover 16. The second chambers 48 and 50 each have a radius limited only by this outer wall 68 of the central body 12, and the second end 34 of the body 12 opens into these second chambers 48 and 50, beyond the shorter radius of the outermost end 66 of the closure plate 28. Thus, if the lid 10 and container C to which it is attached, are inverted, material within the container C will flow past the outer edge 66 of the closure plate 28 and into the second chambers 48 and 50, even if the closure plate is aligned with one of those chambers 48 or 50, due to the second chamber 48/50 openings extending completely to the outermost wall 68 of the body 12.

Preferably, two such second chambers 48 and 50 are provided, with one chamber 48 including a perforated panel 70 at the first end 24 of the central body 12, to provide for the continuous flow of material from an attached container C by shaking the container C, in the manner of a salt or pepper shaker or the like. The other of the second chambers, i.e., the second chamber 50, may be provided with an unrestricted opening at the first end 24 of the central body 12, to allow smooth and continuous flow of material therethrough, as desired. (A baffle is shown within this second chamber 50 in FIGS. 3 and 4, which baffle may be reduced in size or eliminated depending upon the type and consistency of material, to produce the desired flow of material through the chamber 50.)

Figure 4:
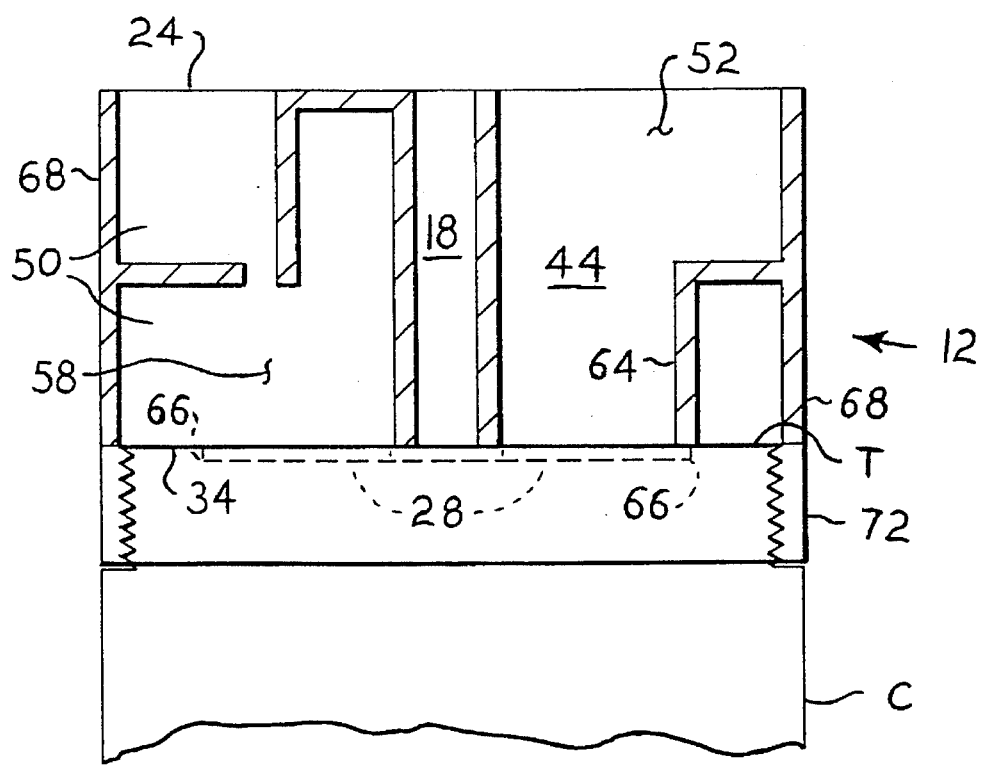
FIG. 4 is an elevation view of the central body portion of the present container lid, taken along line 4—4 of FIG. 3.

The present container lid 10 is secured to an appropriate container C by suitable means, one of which is shown in FIG. 4. Most containers C for which the present lid is adapted, are provided with an externally threaded top T or neck, as shown in FIG. 4. Accordingly, the central body 12 of the lid may include an mating internally threaded skirt 72 depending from the outermost or second wall 68 thereof. Other mating means may be used for differently configured containers, i.e., mating distensible skirts adaptable to be snapped in place over the upper rim of a container, etc., in accordance with the specific configuration of the container being used.

After the appropriate quantity of material to be dispensed is determined, the container C and attached lid assembly 10 are inverted (with the top closure 38 of course first being closed), and the top cover 16 is rotated to position the cover opening 36 away (i.e., not in registry with) the first chamber corresponding to the quantity selected. (It will be noted that the quantity indications 14 on the body 12 are inverted, for ease of reading when the lid 10 and container C are inverted.) This also turns the closure plate 28 away from the selected first chamber, thereby allowing material (spices, herbs, salt, sugar, etc., or even non-comestible material, if used for such) to flow downwardly from the inverted container C and into the first chambers which are not closed off by the closure plate 28, as well as all of the second chambers, which openings in the second end of the central body 12 all extend beyond the outermost edge 66 of the closure plate 28.

The cover 16 is then rotated to align the cover opening 36 with the first chamber of the selected quantity, thereby moving the closure plate 28 (which is in registry with the cover opening 36) across the selected first chamber at the second end 34 of the central body 12. The top closure 38 is then opened, allowing the selected quantity of material to pour from the selected first chamber, with additional material being precluded from entry into the selected first chamber due to the closure plate thereacross. Thus, precisely the desired quantity of material may be dispensed directly, without need for measuring spoons, cups, or other quantity measuring utensils, as shown in FIG. 1.

Further convenience is provided by providing one or more detents 74 (e.g., small dimples and protrusions, or other detent means) respectively along the first end 24 of the central body 12 and the mating inner side 22 of the top cover 16. The mutual engagement of such detents will serve to hold the cover 16 in the desired position relative to the central body 12, as desired. Also, the outer periphery of the top cover 16 may include some form of grip means (e.g., knurling 76, etc.) to provide a better grip for the user of the present container lid 10. The outermost surface of the top cover 16 may also include identification means 78 thereon, serving to identify the specific material contained within the container C to which the lid 10 is secured, as shown in FIG. 2 of the drawings.

As noted further above, the present container lid 10 is particularly well adapted for use in the dispensing of precise quantities of various finely ground or powdered foodstuffs and seasoning, but may also be adapted for use in dispensing virtually any physically similar material (talcum powder, etc.). In fact, by providing a sufficiently good seal at the edges of the closure plate 28 with the first chamber outer wall 64 and radial walls 52 through 60 and flanges, e.g., flanges 62, even specific quantities of liquid material could be dispensed using the present container lid 10, particularly those of relatively high viscosity (honey, syrup, ketchup, etc.). Also, while the present lid 10 is well adapted for attachment to relatively small spice containers of only a few ounces capacity, and the dispensing of relatively small quantities (¼,½, 1 teaspoon, etc.) it will be seen that the present lid 10 lends itself well to scaling up for the dispensing of larger quantities, and/or attachment to a larger container. Moreover, metric, as well as conventional fractional measuring spoon quantities, may be provided, as desired. Thus, the present container lid 10 will be seen to be extremely versatile and useful.

Thus far, only the operation of the present container lid 10 in the dispensing of specific quantities of a given material, has been discussed. However, as noted further above, the container lid 10 also provides for the continuous flow of material through the two second chambers 48 and 50, as shown in FIG. 4 (for flow through the second chamber 50) and FIG. 5 (for flow through the perforated second chamber 48).

The opening 36 in the cover 16 need only be opened and turned to align with the selected second chamber 48/50, and the container inverted, to provide continuous flow (from the chamber 50) or continuous shaking dispensing (from the chamber 48, through the perforated panel 70). As each of the second chambers 48/50 extend to the second, larger diameter wall 68 of central body 12, and the closure plate 28 extends only to the first or smaller diameter wall 64, it will be seen in FIGS. 4 and 5 that material may flow into both of the second chambers 48/50, even when the closure plate 28 is radially aligned with either one of those two chambers 48/50, by flowing past the outermost end 66 of the closure plate 28. (The closure plate 28 is shown in broken lines at its maximum span in both directions from the central passage 18 in FIGS. 4 through 6, in order to make clear the point that it completely covers the second end entrances to all of the smaller radius first chambers 42 through 50, but does not cover the outermost peripheral second end entrances to the second chambers 52 and 54 to allow continuous flow thereinto, regardless of the position of the closure plate 28.)

Various variations may be made on the above described structure, by angling the various walls, rounding the internal passages, etc., but the basic principle would still remain the same, i.e., a plurality of radially disposed chambers each having different volumes from one another, some of which have a more inwardly disposed passage communicating with the attachment end of the lid, which passage may be selectively closed, and some of which have a more outwardly disposed, continually open passage.

In summary, the present container lid 10 provides a most useful accessory for the cook or food preparer in the kitchen, for the dispensing of specific quantities of foodstuffs, condiments, etc. without need for the clutter of additional measuring implements, and thus eliminating any requirement for cleanup of such implements. The lid is used by securing it to the open top of an existing container, inverting the container and attached lid, dialing the top cover away from the selected quantity to allow the selected volume to be filled with material from the container, turning the top cover to align with the selected quantity, and opening the cap of the dispensing opening. Continuous shaking or pouring dispensing is accomplished merely by turning the opening of the top cover to the proper position on the body (as marked thereon), inverting the container and lid, and opening the cap. Thus, the present lid provides considerably greater versatility than earlier developed quantity dispensing devices, due to its ability to dispense precisely measured quantities and also to provide continuous flow, both of which features were heretofore unavailable in a single device.

The present lid may also be provided in combination with a new container, if desired, in the manner of lids which include both perforated and unrestricted openings and which are sold with the material container. The present lid is relatively inexpensive to produce from injection molded plastic or other suitable manufacturing process, and thus may be provided as an inexpensive accessory with condiments, spices, etc. when they are sold.

It is to be understood that the present invention is not limited to the sole embodiment described above, but encompasses any and all embodiments within the scope of the following claims.

I claim:

1. A container lid with quantity measures, comprising:

a fixed cylindrical central body having a first end and an opposite second end, a plurality of first chambers and second chambers therein, and a central passage therethrough, with said chambers being disposed radially about said central body and each being separated by a radial wall extending between said first end and said second end of said central body, with each said radial wall being spaced apart from one another by an arcuate span, and with each of said chambers subtending a separate arcuate volume of said cylindrical body and being open to said first end and said second end of said central body, and with at least said first chambers each having a different volume from one another;

a circular cover adapted to rotate relative to said central body, with said cover having an inner surface with a central shaft extending therefrom and adapted to engage said central passage of said central body to secure said cover to said central body adjacent said first end thereof, and further having a dispensing opening subtending an arcuate span of said circular cover substantially equal to said arcuate span between each said radial wall of said central body at said second end thereof, and selectively openable closure means for said dispensing opening, and;

said central shaft having a distal end with a central body chamber closure plate immovably secured thereto, thereby sandwiching said central body between said circular cover and said closure plate, with said closure plate subtending an arcuate span substantially equal to said arcuate span between each said radial wall of said central body at said second end thereof and of said dispensing opening of said circular cover, and lying in direct registry with said circular cover, whereby;

said container lid is affixed to a container having a material therein, the container and said container lid affixed thereto are inverted, said circular cover is rotated to misalign said dispensing opening and said closure plate relative to a selected one of said first chambers thereby allowing material from the container to flow downwardly into said selected one of said first chambers, and said circular cover is further rotated to align said dispensing opening of said circular cover with said selected one of said first chambers, thereby positioning said closure plate across said selected one of said first chambers to preclude further flow of material therein, and said selectively openable closure means of said circular cover is opened to allow a predetermined amount of material defined by said arcuate volume of said selected one of said first chambers to flow therefrom.

2. The container lid of claim 1, wherein:

said central body has a first diameter defined by a concentric circular first wall formed at least partially therearound, with said first wall comprising an outermost wall for each of said first chambers;

said closure plate has an outermost edge substantially in registry with said outermost wall for each of said first chambers, and;

said central body and said circular cover each have a second diameter equal to one another and larger than said first diameter of said central body, and said second chambers each have an outermost wall defined by said second diameter of said central body, thereby allowing material to flow past said outermost edge of said closure plate into said second chambers to provide continuous flow through at least one of said second chambers when said circular cover opening is in registry therewith and said closure means of said circular cover is opened.

3. The container lid of claim 1, wherein:

said first end of said central body includes a perforated panel across at least one of said second chambers, adapted to restrict material flow therethrough and to provide for the continuous shaking flow of material from the container to which said container lid is affixed.

4. The container lid of claim 1, wherein:

said central body has an outermost wall formed therearound, with said outermost wall including an internally threaded skirt depending therefrom and adapted for threaded installation to the top of a material container.

5. The container lid of claim 1, wherein:

said closure means for said dispensing opening is permanently secured to said circular cover by a live hinge.

6. The container lid of claim 1, wherein:

said central body has an outermost wall formed therearound, and each of said first chambers includes a quantity indication corresponding to each said different volume thereof and marked upon said outermost wall of said central body in registry with a corresponding one of said first chambers.

7. The container lid of claim 6, wherein:

each said quantity indication marked upon said outermost wall of said central body, is inverted to provide for upright legibility of each said quantity indication when said container lid and the container to which said lid is attached, are inverted.

8. The container lid of claim 1, wherein:

said container lid is adapted for use with a container having a specific material therein, and said circular cover includes identification means thereon providing for the identification of the specific material within the container.

9. The container lid of claim 1, including:

detent means disposed between said central body and said circular cover, said detent means precluding inadvertent slippage of said circular cover relative to said central body.

10. The container lid of claim 1, wherein:

said circular cover has a periphery adapted to provide a good grip for the rotation of said circular cover relative to said central body.

11. A container and container lid with quantity measures, comprising in combination:

a container providing for the storage therein and dispensing of a material therefrom, with said container having a open top;

a container lid having a fixed cylindrical central body with a first end and an opposite second end, a plurality of first chambers and second chambers therein, and a central passage therethrough, with said chambers being disposed radially about said central body and each being separated by a radial wall extending between said first end and said second end of said central body, with each said radial wall being spaced apart from one another by an arcuate span, and with each of said chambers subtending a separate arcuate volume of said cylindrical body and being open to said first end and said second end of said central body, and with at least said first chambers each having a different volume from one another;

said container lid further including a circular cover adapted to rotate relative to said central body, with said cover having an inner surface with a central shaft extending therefrom and adapted to engage said central passage of said central body to secure said cover to said central body adjacent said first end thereof, and further having a dispensing opening subtending an arcuate span of said circular cover substantially equal to said arcuate span between each said radial wall of said central body at said second end thereof, and selectively openable closure means for said dispensing opening, and;

said central shaft of said circular cover of said lid having a distal end with a central body chamber closure plate immovably secured thereto, thereby sandwiching said central body between said circular cover and said closure plate, with said closure plate subtending an arcuate span substantially equal to said arcuate span between each said radial wall of said central body at said second end thereof and of said dispensing opening of said circular cover, and lying in direct registry with said circular cover, whereby;

said container lid is affixed to said open top of said container having a material therein, said container and said container lid affixed thereto are inverted, said circular cover is rotated to misalign said dispensing opening and said closure plate relative to a selected one of said first chambers thereby allowing material from said container to flow downwardly from said open top into said selected one of said first chambers, and said circular cover is further rotated to align said dispensing opening of said circular cover with said selected one of said first chambers, thereby positioning said closure plate across said selected one of said first chambers to preclude further flow of material therein, and said selectively openable closure means of said circular cover is opened to allow a predetermined amount of material defined by said arcuate volume of said selected one of said first chambers to flow therefrom.

12. The container and container lid combination of claim 11, wherein:

said central body of said lid has a first diameter defined by a concentric circular first wall formed at least partially therearound, with said first wall comprising an outermost wall for each of said first chambers;

said closure plate of said lid has an outermost edge substantially in registry with said outermost wall for each of said first chambers, and;

said central body and said circular cover of said lid each have a second diameter equal to one another and larger than said first diameter of said central body, and said second chambers each have an outermost wall defined by said second diameter of said central body, thereby allowing material to flow past said outermost edge of said closure plate into said second chambers to provide continuous flow through at least one of said second chambers when said circular cover opening is in registry therewith and said closure means of said circular cover is opened.

13. The container and container lid combination of claim 11, wherein:

said first end of said central body of said lid includes a perforated panel across at least one of said second chambers, adapted to restrict material flow therethrough and to provide for the continuous shaking flow of material from said container to which said container lid is affixed.

14. The container and container lid combination of claim 11, wherein:

said open top of said container is externally threaded, and;

said central body of said lid has an outermost wall formed therearound, with said outermost wall including an internally threaded skirt depending therefrom and adapted for threaded installation to said top of said container.

15. The container and container lid combination of claim 11, wherein:

said closure means for said dispensing opening of said circular cover of said container lid is permanently secured to said circular cover by a live hinge.

16. The container and container lid combination of claim 11, wherein:

said central body of said lid has an outermost wall formed therearound, and each of said first chambers includes a quantity indication corresponding to each said different volume thereof and marked upon said outermost wall of said central body in registry with a corresponding one of said first chambers.

17. The container and container lid combination of claim 16, wherein:

each said quantity indication marked upon said outermost wall of said central body of said lid, is inverted to provide for upright legibility of each said quantity indication when said container and said container lid are inverted.

18. The container and container lid combination of claim 11, wherein:

said container lid is adapted for use with said container having a specific material therein, and said circular cover includes identification means thereon providing for the identification of the specific material within said container.

19. The container and container lid combination of claim 11, including:

detent means disposed between said central body and said circular cover of said lid, said detent means precluding inadvertent slippage of said circular cover relative to said central body.

20. The container and container lid combination of claim 11, wherein:

said circular cover of said lid has a periphery adapted to provide a good grip for the rotation of said circular cover relative to said central body of said lid.

* * * * *